(12) United States Patent
Miglioli et al.

(10) Patent No.: US 8,457,481 B2
(45) Date of Patent: Jun. 4, 2013

(54) HERMETIC FLEXIBLE BAG TO PROTECT CAMERAS AND PORTABLE ELECTRONIC

(75) Inventors: Roberto Ferreira de Souza Miglioli, Sao Paulo (BR); Jose Carlos Ferreira De Souza, Sao Paulo (BR)

(73) Assignee: Jose Carlos Ferreira de Souza, Jr., La Canada, CA (US)

( * ) Notice: Subject to any disclaimer, the term of this patent is extended or adjusted under 35 U.S.C. 154(b) by 0 days.

(21) Appl. No.: 12/376,263

(22) PCT Filed: Oct. 5, 2006

(86) PCT No.: PCT/BR2006/000209
§ 371 (c)(1),
(2), (4) Date: Nov. 5, 2009

(87) PCT Pub. No.: WO2008/040102
PCT Pub. Date: Apr. 10, 2008

(65) Prior Publication Data
US 2010/0147715 A1    Jun. 17, 2010

(51) Int. Cl.
*G03B 17/08* (2006.01)
(52) U.S. Cl.
USPC .......................................................... 396/27
(58) Field of Classification Search
USPC .................. 396/25, 27, 28, 29; 348/81
See application file for complete search history.

(56) References Cited

U.S. PATENT DOCUMENTS

| 3,026,784 | A |   | 3/1962  | Byers |
| 4,033,392 | A | * | 7/1977  | Less ............................. 206/316.2 |
| 4,071,066 | A | * | 1/1978  | Schaeffer .................... 206/316.2 |
| 4,176,701 | A | * | 12/1979 | Welgan ........................ 206/316.2 |
| 4,751,950 | A |   | 6/1988  | Bock |
| 5,159,366 | A |   | 10/1992 | Gell, Jr. |
| 5,953,543 | A | * | 9/1999  | Shepper ............................ 396/29 |
| 6,311,017 | B1 | * | 10/2001 | Mori .................................. 396/27 |
| 2006/0096874 | A1 | * | 5/2006  | Doran, Jr. ................... 206/316.2 |
| 2008/0247750 | A1 | * | 10/2008 | Law et al. ...................... 396/535 |

FOREIGN PATENT DOCUMENTS

DE    8900878 U    3/1989

OTHER PUBLICATIONS

International Search Report for PCT/BR2006/000209, Dec. 5, 2007.

* cited by examiner

*Primary Examiner* — Rodney Fuller
(74) *Attorney, Agent, or Firm* — Colin P. Abahams (57) ABSTRACT

"Hermetic flexible bag to protect cameras and portable electronic equipment" which comprises a set formed by the following components: a flexible bag, UV filter, eye-window and in some embodiments the set can also present a flash support and a tripod connection. The flexibility of the manufacturing material enables that the same hermetic flexible bag be used with several types of equipment of similar shape and size. It also provides protection for the equipment without making its use difficult. The equipment is always protected and ready to be used.

15 Claims, 9 Drawing Sheets

HERMETIC FLEXIBLE BAG TO PROTECT CAMERAS AND PORTABLE ELECTRONIC

INVENTION BACKGROUND & FIELD OF INVENTION

Electronic devices such as cameras, camcorders, cell phones, audio/video hand-held players, laptops, and personal organizers are a growing part of everyday life. These increasingly portable electronic devices are used for several purposes, including scientific, professional and leisure purposes. These devices, however, are seldom designed to withstand the hazardous environmental conditions in which they are often used. Moisture, dirt, dust, water, mud, sand, or other undesired environmental elements can damage them, render them inoperative, or prevent their use altogether.

The present invention patent presents a new an innovative way to protect electronic equipment such as cameras, camcorders, portable radios, cellular phones, laptops, audio/video devices, accessories, etc. It uses a flexible bag of innovative conception and is endowed with important technological and functional improvements, according to the latest engineering concepts, which grants it a series of technical, practical and economical advantages.

PRIOR ART/RELATED ART

Devices do exist that are designed to withstand or resist hazardous environmental conditions. Some photo cameras, film cameras, portable radios, and audio devices are manufactured specifically for the aquatic environment. These are often developed with sealing systems or special customized chambers, but are also often heavier, bigger, and more expensive than conventional products/devices since they are customized for extreme use. For these reasons, these products have niche market penetration and are seldom adopted by a wide number of users.

In the specific case of cameras & camcorders, there are also accessories that, when coupled to the conventional product, allow for their use in humid, wet, or completely submerged (under water) environments. These accessories are usually in the form of water tight chambers that are custom sized and shaped to work only with a single make and model of the particular camera or equipment. They are manufactured with bulky rigid materials or semi-rigid materials that significantly increase the overall volume and weight of the camera or equipment. This increased weight also means underwater equipment is seldom compatible with (or at least desirable for) amphibian or above-water use.

Advantages of the Invention

Over time specific studies have been made to develop a means of protection for portable electronic equipment such as cameras, portable radios, mobile phones, portable audio/video devices, computer laptops, and other electronic equipment that reduces or eliminates the hazardous environmental conditions described, and also minimizes the inconveniences mentioned above such as size, weight, and cost. As a result, a protective system/set/kit using a flexible, hermetic bag was developed for use with electronic equipment described in the present invention patent. This innovative protective, sealing system/kit/set is based on an external, flexible, hermetic covering bag of various levels of transparency, robustness, thickness, and tactile composition that protects the electronic equipment inside it by isolating the external hazardous environmental conditions from the product. Along with these bags, the present patent also comprises accessories that increase the flexibility of its use with several types of devices. These accessories are glass or plastic windows for the electronic devices' displays, sight holes, filters for cameras lenses, and couplings for flashes, tripods, or headphones. These accessories can be removable or not, and are coupled to the cover/covering bag; some in a hermetic, water-proof fashion. This innovative covering bag system/kit/set allows that such equipment be totally isolated from the outer environment, therefore avoiding damage from environmental elements already mentioned.

The system's flexible, malleable covering bag in conjunction with its accessories also presents fundamental benefits to anything currently available:

It works with various makes & models of particular lines of product. One system/kit/set can work for different cameras or laptops from a particular brand, for example, so the user doesn't have to purchase a new set for different products.

Its light-weight does not add significantly to the overall weight of the equipment being protected, maximizing portability and its use above and below water simultaneously.

Its flexible form factor makes it adaptable to almost any means of transportation, and does not require specific carrying cases. In other words, because it's flexible & malleable, the covering bag and its accessories occupy very little room and can be more readily available for use.

The present invention patent can also be comprised on a non-hermetic external covering flexible bag that provides all of the environmental protection described above, including water-resistance, without being water-proof.

BRIEF DESCRIPTION OF THE INVENTION

The present invention patent is comprised of the following components; the external covering flexible bag itself, and needed accessories that render it hermetic, such as an UV filter and an eye-window in the case of a camera. In some of its other embodiments, it can also comprise a flash support and a tripod connection.

The flexible bag is a flexible and waterproof body of varying degrees of transparency, robustness, thickness, and tactile composition. The bag is manufactured of rubber latex or silicone and in a manner void of stitching, joints, welds or junctions. The shape and size of this flexible bag, when applied, is close to that of the equipment being protected, but this contouring feature allows it to be used for several different makes and models that present similar shapes and sizes. Due to the flexible composition of the material and its contouring properties when installed to the equipment being protected, the bag gives the user easy access to all the buttons and functions of the equipment, independently of its model and make. The flexible qualities of the protective bag also allow for tactile feedback from the equipment, giving the user better grip and greater control over the product/equipment. The flexible bag also comprises glass or plastic panels, which allow user access to LCD screens or other such information display areas of the equipment.

The installation of the flexible protective bag on the equipment is done through an opening in the bag itself; described as an "O-ring". The flexibility of the material allows for the equipment to enter the flexible bag's opening without damaging either bag or equipment.

In the specific case of photo and film cameras, the flexible bag is provided with a set of circular holes that forms windows of entry for the product itself. The flexible o-ring format rims allows for the tight sealing of the bag and other components/accessories in the present patent contouring the equipment without damaging either; product or the bag itself. The accessories in the case of camera are UV filters, eye-windows, flash supports and tripod connections. The couplings for the flash, tripod or LCD can or cannot be implemented/executed to the protection bag/cover according to the need for a specific model of camera. There are several models of covers, for all the possible combinations from cameras with flashes or tripods, up to cameras with LCD.

Hermetic Flexible Protective Bag Accessories

The UV filter accessory used for camera lenses is composed of three (3) parts: the lens-filter, the washer, and the screw-nut. The main body of the UV filter presents, on its aft portion, a cylindrical base with a screw thread that fits the standard support screw thread of the camera's lens. The central portion of the main body of the UV filter is composed by a baffle plate of a greater diameter and it is where the o-ring of the flexible bag is supported. The fore portion of the main body of the UV filter comprises a support with a screw, with a smaller diameter in relation to its central portion and it is where the coupling of the washer and the screw-nut is made. This main body of the UV filter presents a longitudinal through hole where the lens is glued. The lens can be manufactured with optical glass or acrylic. The washer is a ring shaped body and has an "L" shaped section and the lower portion of this section is in placed in the inner side of the washer and it is where the o-ring of the flexible bag is placed.

The UV filter is manufactured in different sizes to match various makes and models of cameras. The sealing is done through the fitting of the O-ring of the flexible purse in the lower portion of the washer with the consecutive fastening of the screw-nut on the washer.

A systems/kit/set for the eye-window is comprised of four (4) parts: the covering bag, the washer, the screw nut and the lens. Similar to the UV filter set, in the eye-window, the washer also presents an "L" section, which fits in the main body for the sealing of the O-ring of the flexible purse through the screw-nut, and the lens is installed on the main body of the product. The difference in relation to the UV filter, besides the size, is the base of the main body that is secured on the camera through a sliding mortise support, which is placed on the display of the back panel of the camera. A variation for cameras with Liquid Crystal Displays contains a large viewing window as part of the covering bag. For this specific case, the diameter of the eye-window is larger and it presents, on its lower portion, an open area that allows for the viewing of the LCD screen of the camera. The eye-window can also be manufactured in several different dimensions according to the user's needs and can accommodate different cameras makes and models.

A System/set/kit with the flash support is comprised by three (3) parts: the covering bag, the washer and the screw-nut. Similar to the tripod its fixation is done to the body of the camera at the sliding flash fitting mortise. A support with a sliding fitting similar to the flash is placed on the upper portion of the main body of the flash support. The sealing system of this flash support is similar to the one of the UV filter, where the washer presents an "L" section that fits the main body for the sealing of the o-ring of the flexible bag through the screw-nut.

The connection for tripod is comprised by three parts: the main body, the washer and the screw nut. Its fixation on the body of the camera is made by a screw thread that is proper for the fixation of tripods. The sealing system of this tripod connection is similar to the one of the UV filter, where the washer presents an "L" section, which fits the main body for the sealing of the O-ring of the flexible bag through the screw-nut.

The main bodies of the UV filter, eye-window, flash support and tripod connection are partially placed inside the flexible bag to support the o-rings of their respective windows. Screwing the fittings of each respective washer seals the product, making it hermetic. This way, when installed the system/kit/set protects the product from outside elements and conditions completely.

Non-Hermetic Flexible Protective Bag

There are also non-hermetic applications for this system/kit/set. The covering bag can be used without the accessories that seal the product hermetically. These applications protect the products in all but a water-resistant fashion, making the water-resistant, but not water-proof.

Similarly to the hermetic flexible protective bags, the covering bag may contain viewing windows made of plastic or other materials that allow the user to see the LCD and other product functions.

In the case of cameras, the covering bag is applied through an o-Ring or slit-like opening. The opening may contain a zipper or Velcro application to further seal entry of hazardous elements into the body of the bag.

In the case of cell phones, the covering may contain an opening, window, and very small openings to allow better sound conductivity.

In the case of an audio player, such as a portable MP3/MP4 player, the covering bag may contain an opening, window for display, and an opening for headphone jack.

In the case of portable DVD player or computer/laptop, the covering bag may utilize Velcro to protect the products while being transported, and windows for protection during operations. Different models would offer different levels of protection for various needs/uses.

BRIEF DESCRIPTION OF THE DRAWINGS

For a clear visualization of the invention in question, the following illustrative drawings are enclosed.

DETAILED DESCRIPTION OF THE PREFERRED EMBODIMENTS

According with these drawings and its details, the hermetic flexible bag to protect cameras and portable electronic equipment comprises a flexible bag (1), a UV filter (2), an eye-window (3), a flash support (4) and a tripod connection (5).

The flexible bag (1) is a body manufactured with a flexible material, which could be transparent or not. When it is full, it presents a similar shape to the dimensions of the model of the camera to be protected, being each camera characterized by the dimensions of the objective-lens portion (11) and of the back panel portion (12) with their respective resiliencies for the hand support (121) and for the viewfinder (122).

Figure 1:
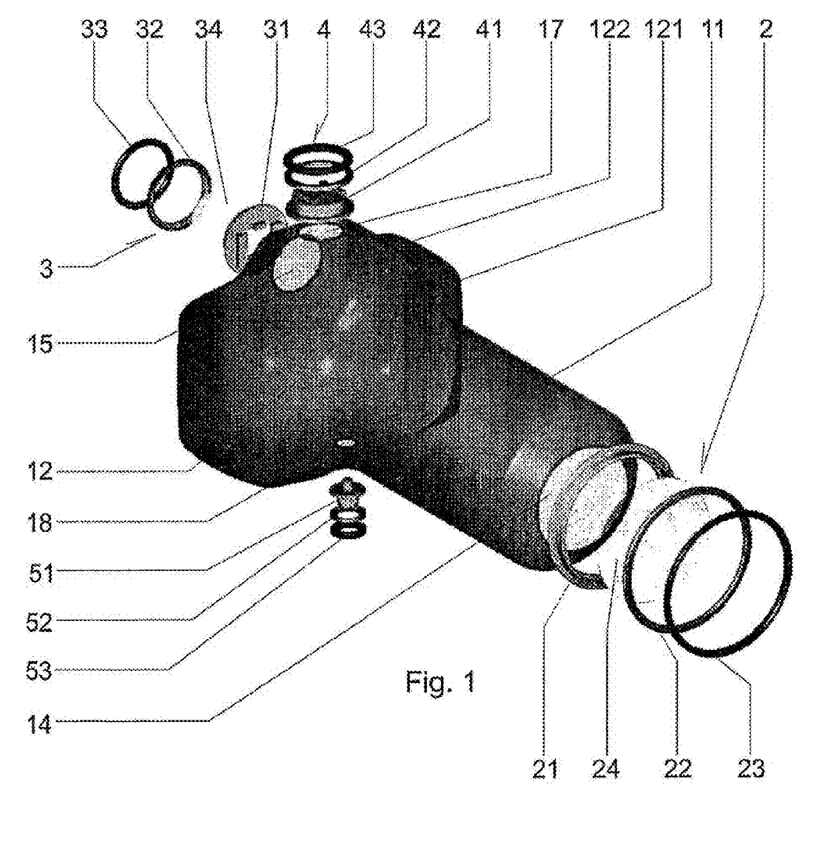
FIG. 1 is a front perspective view of such hermetic flexible bag for conventional photo cameras and with fittings for UV filter, eye-window, flash support and tripod connection.
Figure 2:
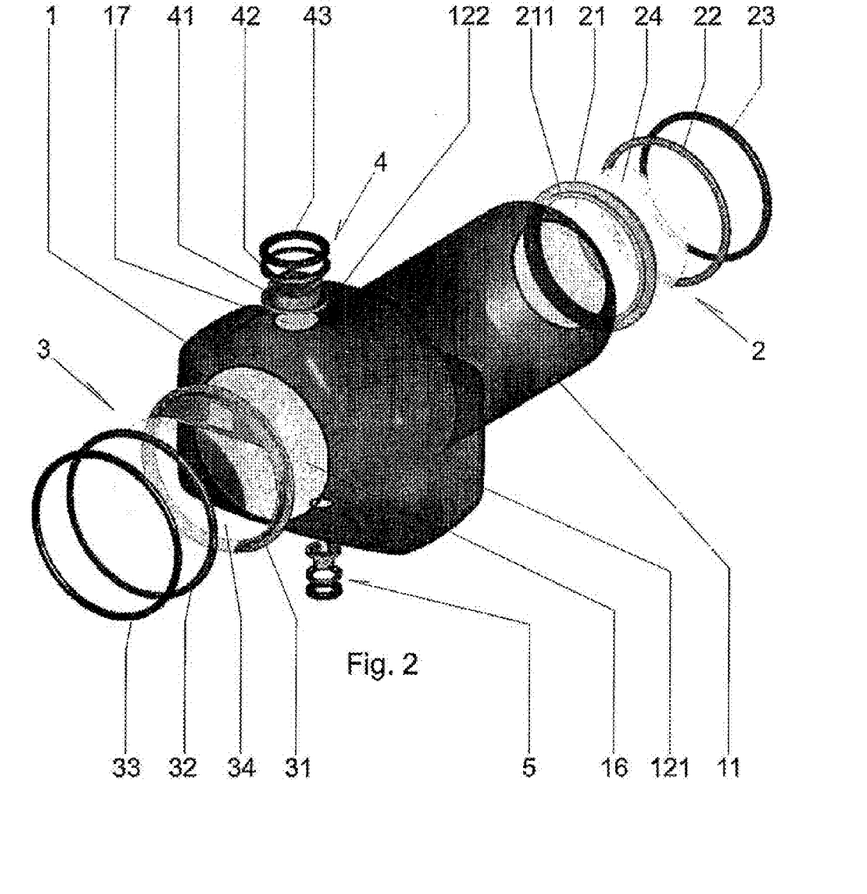
FIG. 2 is a back perspective view of the hermetic flexible bag for cameras with an LCD screen, which has fittings for UV filter, eye-window for the LCD screen, flash support and tripod connection.

The flexible bag (1) is provided with a set of circular holes (14), (15), (16), (17) and (18) that form windows. Each of these windows presents a rim in an o-ring shape (13). The fore potion of the flexible bag is provided with a hole (14) related to the coupling of the UV filter (2) on the support of the objective of the photo camera. The aft portion of the flexible bag (1) is provided with a hole (15) related to the coupling of the eye-window (3) on the support of the back panel of the camera. In the specific case of cameras with an LCD screen, the flexible bag is provided with a hole (16) of a greater diameter related to the coupling of the eye-window for LCD screens (3a). The upper portion of the flexible bag is provided with a hole (17) related to the coupling of the flash support (4) on the flash fixation support of the camera. The lower portion of the flexible bag is provided with a hole (18) related to the coupling of the tripod connection (5) on the fixation support of the camera tripod.

Figure 3:
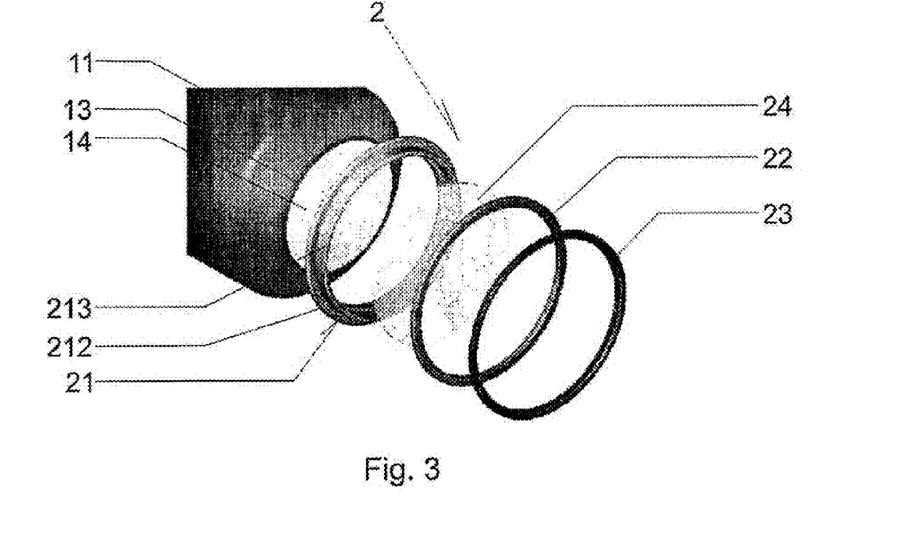
FIG. 3 is a detailed perspective view of the fore portion of the hermetic flexible bag and its respective structural disposition of the UV filter.
Figure 7:
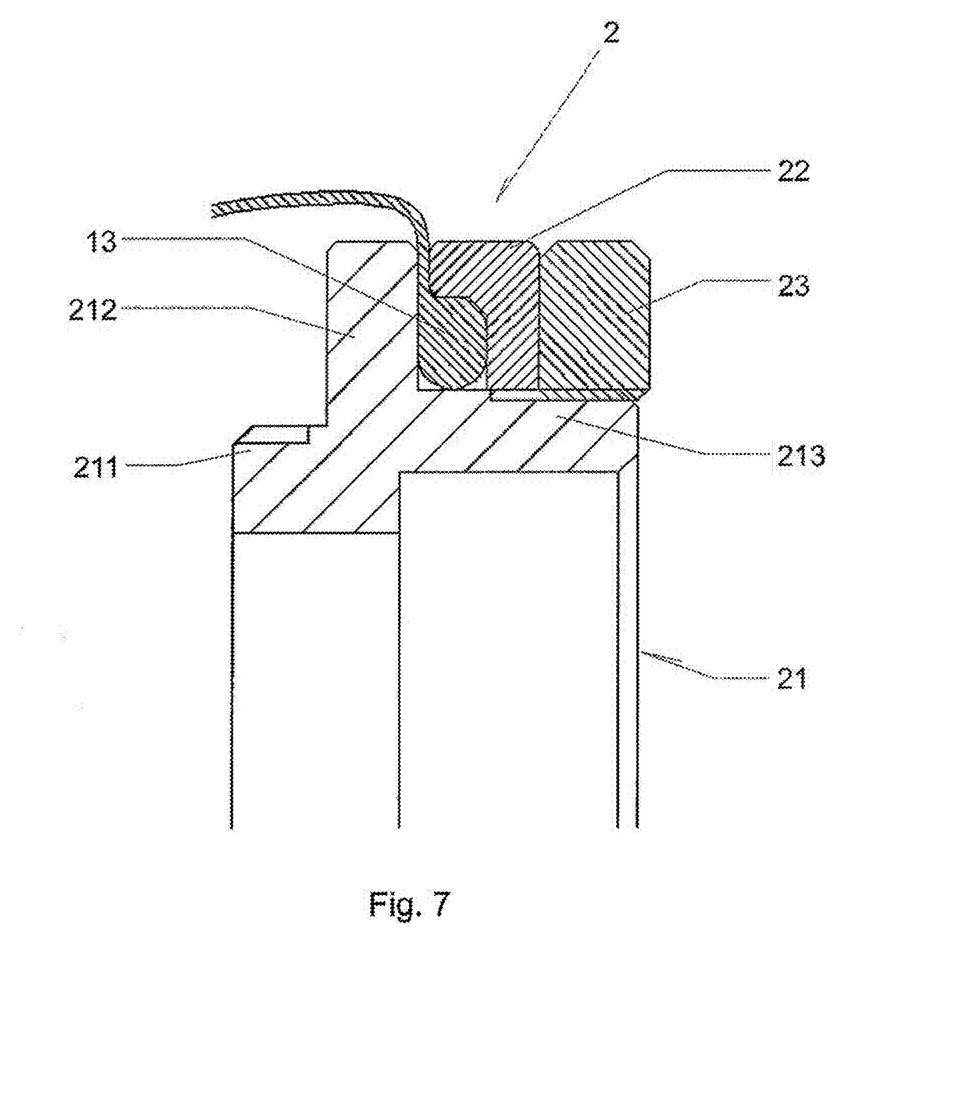
FIG. 7 is a detailed section view of the functioning of the sealing system involving the o-ring, the washer and the screw-nut.

The UV filter is placed on the fore portion of the flexible bag and comprises four parts: the main body (21), the washer (22), the screw-nut (23) and lens (24). The main body (21) is a body with a longitudinal through hole, presenting a predominantly cylindrical shape and it is formed by three parts: a fixation base (211) which is fixated through the screw thread on the standard support of the objective of the camera; a central support (212) of a greater diameter that allows the support of the o-ring (13) of the hole (14); and a support with a screw (213) where the fitting of the washer (22) and the screw-nut (23) is made. The washer (22) is a ring shaped body with an "L" section, being the lower portion of this section placed on the internal side of the washer (22). The screw-nut (23) is a ring shaped body presenting a screw thread that enables the fastening of the washer (22) on the o-ring (13) of the hole (14). The lens (24) of the UV filter is manufactured in a translucent material and it is installed on the main body (21) through gluing or any other method that enables the full sealing between these two components.

Figure 4:
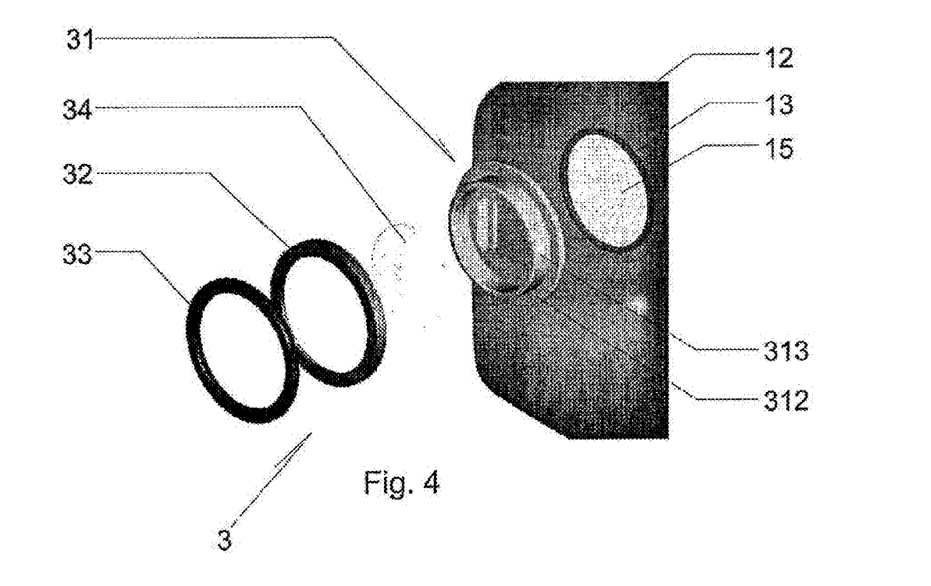
FIG. 4. is a detailed perspective view of the aft portion of the hermetic flexible bag and the structure of the eye-window.

The eye-window (3) is placed on the aft portion of the flexible bag and it is composed by four parts: the main body (31), the washer (32), the screw-nut (33) and lens (34). The main body (31) is a body with a longitudinal through hole, presenting a predominantly cylindrical shape and it is formed by three parts: a fixation base (311) that fixated itself through a sliding mortise on back panel of the photo camera; a central support (312) of a greater diameter that supports the o-ring (13) of the hole (15) or (16); and a support with a screw thread (313) where the washer (32) and the screw-nut (33) are coupled. The washer (32) is a ring shaped body with an "L" section and the lower portion of this section is placed in the inner side of the washer. The screw-nut (33) is a ring shaped body presenting a screw thread that the enables the tightening of washer (32) on the o-ring (13) of the hole (15) or (16). The lens (34) of the eye-window is manufactured with a translucent material and it is installed on the main body (31) through gluing or any other method that allows the total sealing between those two components.

Figure 5:
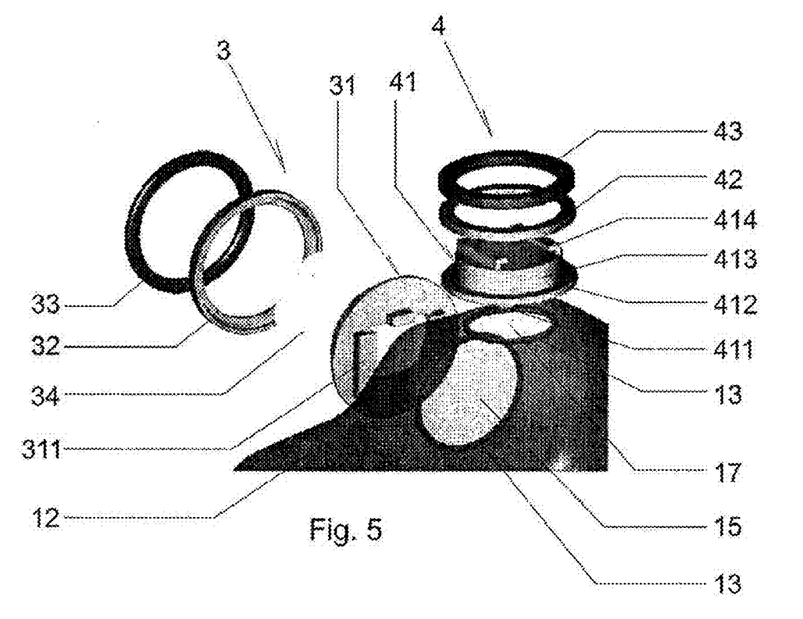
FIG. 5 is a detailed perspective view of the upper portion of the hermetic flexible bag and the flash support structure.

The flash support (4) is placed on the upper portion of the flexible bag and it is composed by three parts: the main body (41), the washer (42) and the screw-nut (43). The main body (41) is predominantly cylindrical shaped body and it is formed by four parts: the fixation base (411) that fixated itself through the sliding mortises of the own flash of the photo camera; a central support (412) of a greater diameter that enables support for the o-ring (13) of the hole (17); a support with a screw thread (413) where the tightening of the washer (42) and the screw-nut (43) is made and an upper support (414) that presents the same shape of the sliding mortise of the photo camera flash. The washer (42) is a ring shaped body with an "L" section and the lower portion of this section is placed in the inner side of the washer. The screw-nut (43) is a ring shaped body presenting a screw thread that enables the tightening of the washer (42) on the o-ring (13) of the hole (17).

Figure 6:
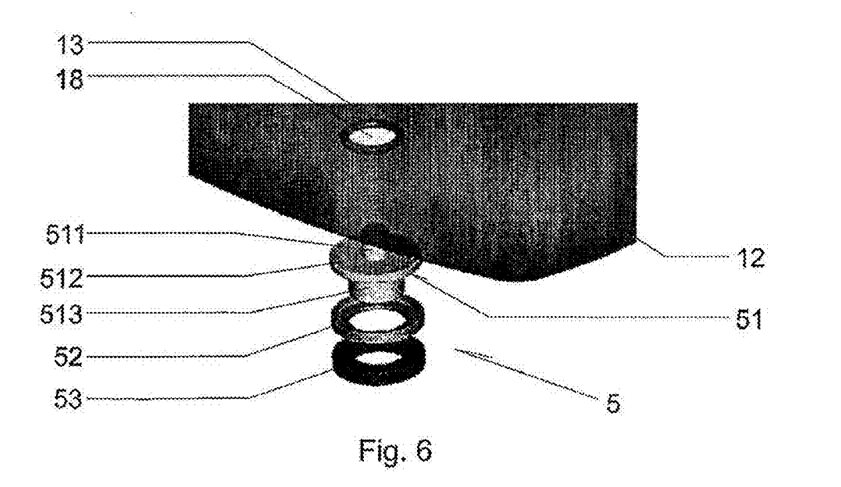
FIG. 6 is a detailed perspective view of the lower portion of the hermetic flexible bag and the tripod connection structure.

The tripod connection (5) is placed on the lower portion of the flexible bag and it is composed by three parts: the main body (51), the washer (52) and the screw-nut (53). The main body (51) is predominantly cylindrical shaped body that is formed by three parts: a fixation base (511) that fixates itself through the screw coupling of the own tripod fixation of the photo camera; a central support (512) of a greater diameter that supports the o-ring (13) of the hole (18); a support (513) with an external screw thread where the coupling of the washer (52) and the screw-nut (53) is conducted, and this support (513) also presents a internal longitudinal hole with a screw thread that is similar to the coupling hole of photo camera tripods. The washer (52) is a ring shaped body with an "L" section and the lower portion of this section is placed in the inner side of the washer. The screw-nut (53) is a ring shaped body presenting a screw thread which enables the tightening of the washer (52) on the o-ring (13) of the hole (18).

Figure 8:
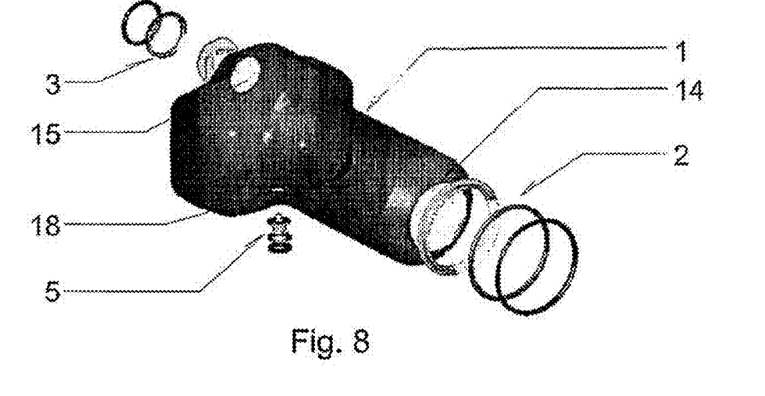
FIG. 8 is a perspective view of another embodiment of the hermetic flexible bag with UV filter, eye-window and tripod connection structures but without the flash support.
Figure 9:
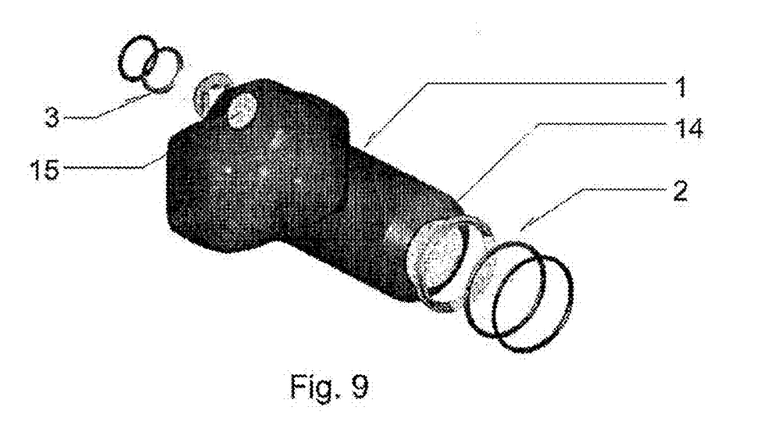
FIG. 9 is a perspective view of yet another embodiment of the hermetic flexible bag with just the UV filter and eye-window structures.
Figure 10:
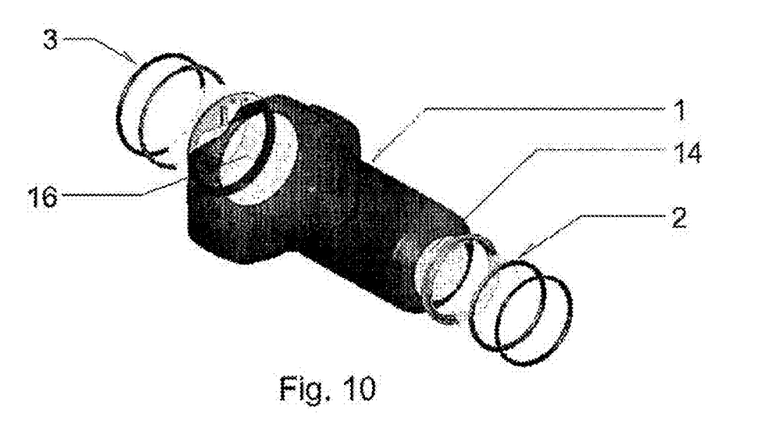
FIG. 10 is a perspective view of still another embodiment of the hermetic flexible bag for photo cameras with an LCD screen with just the UV filter and the eye-window for the LCD screen structures.
Figure 11:
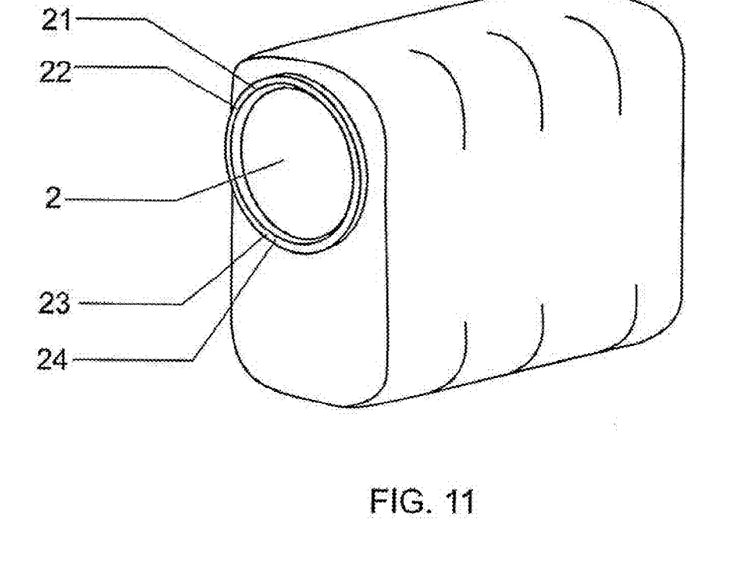
FIG. 11 is a perspective view of another embodiment of the hermetic flexible bag for film cameras of the camcorder type.
Figure 12:
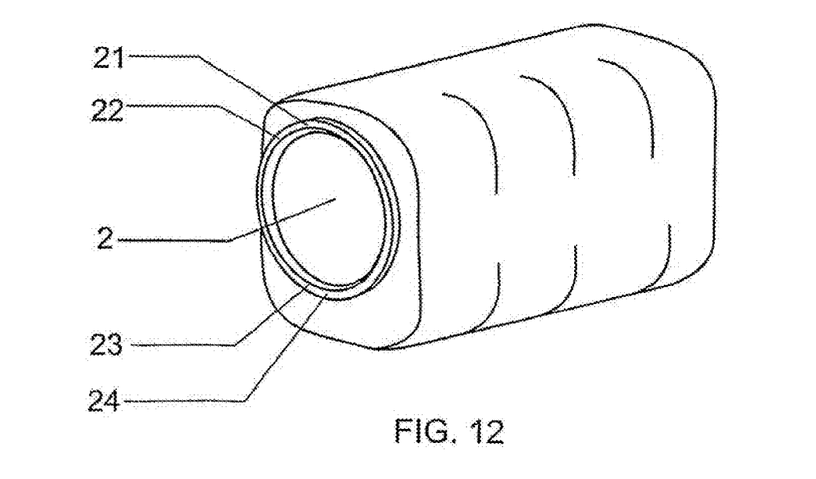
FIG. 12 is a perspective view of another embodiment of the hermetic flexible bag for another type of film camera, also of the camcorder type.
Figure 13:
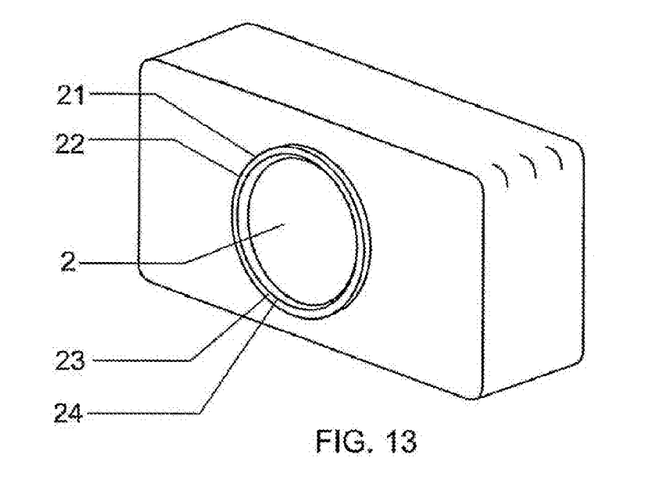
FIG. 13 is a perspective view of an embodiment of the hermetic flexible bag for digital cameras.
Figure 14:
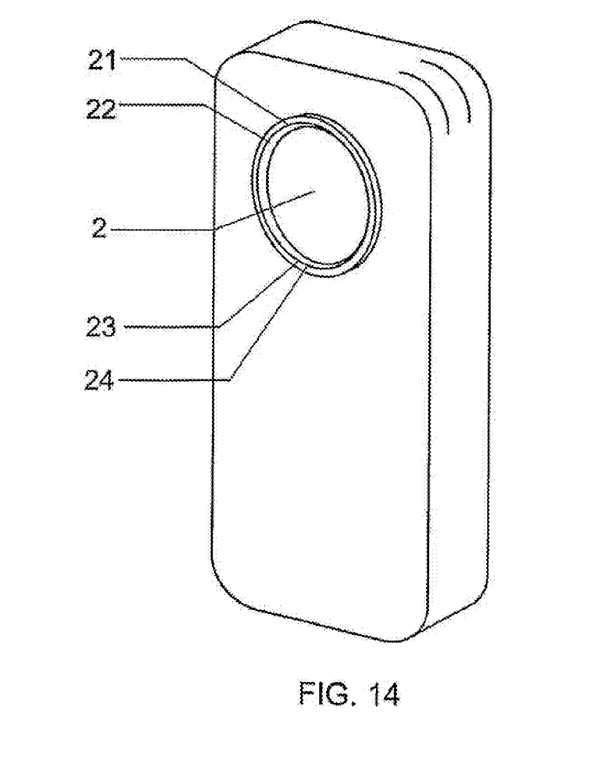
FIG. 14 is a perspective view of an embodiment of the hermetic flexible bag for a cellular phone.
Figure 15:
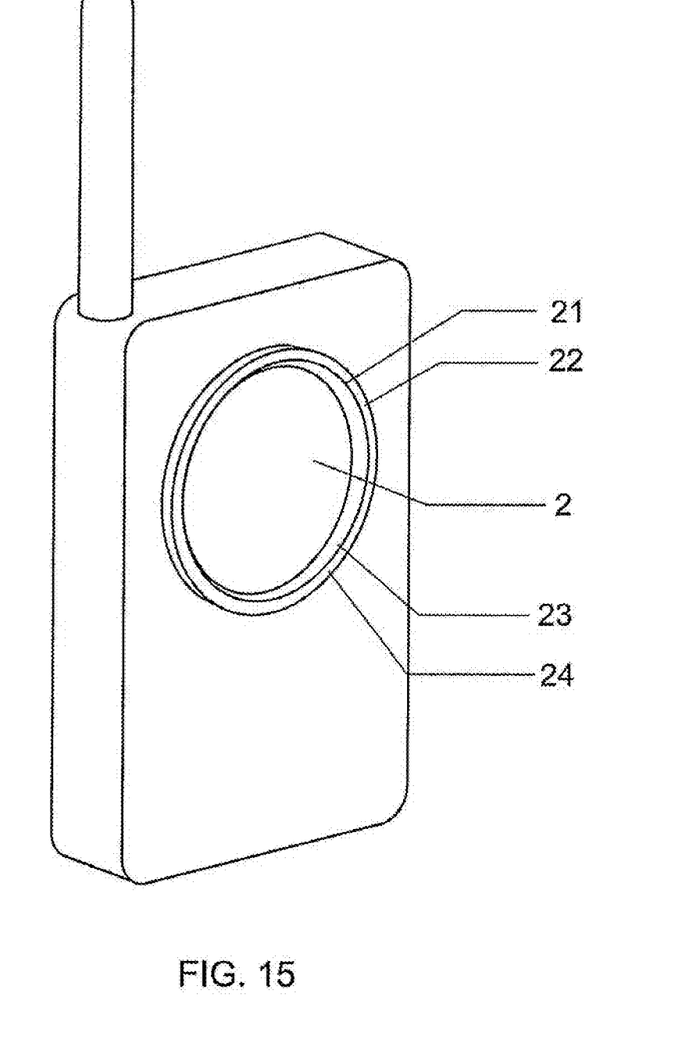
FIG. 15 is a perspective view of an embodiment of the hermetic flexible bag for a communication radio of the walk talk type.

The present invention can present different embodiments according to the design of the different models of cameras and electronic equipment; these different embodiments enable that the hermetic flexible bag present fittings for all its components such as UV filter (2), eye-window (3) or eye-window (3a), flash support (4) and tripod connection (5); or it makes it possible for the flexible bag to present only some of theme such as the UV filter (2) and the eye-window (3) as well as the other variations of such components.

We have no knowledge of a hermetic flexible bag manufactured with rubber latex or silicone, which is used with portable electronic equipment such as photo cameras, film cameras, camcorders, portable radios, cellular phones, audio/video devices and the like, and has the same features or design of this invention.

Therefore the object of the present invention is of great importance for its use, vested with unique innovative features and consequently with the requisites of novelty and inventive step, deserving, therefore, full patent protection according to the terms and conditions of the Law.

The invention claimed is:

1. A protective cover for a camera having a lens and an image viewer, the protective cover comprising:
   a molded elasticized housing forming a chamber having a body shaped portion and a lens shaped portion for receiving the camera and lens respectively, the housing having a lens opening with a peripheral edge in the lens shaped portion and an image viewer opening with a peripheral edge in the body shaped portion;
   a first fastening system for the lens opening, the first fastening system having an internal fastener attachable to the lens of the camera and an external fastener attachable to the internal fastener, the internal fastener and external fastener capturing therebetween the peripheral edge of the lens opening when secured to each other;
   a second fastening system for the image viewer opening, the second fastening system having an internal fastener attachable to the image viewer of the camera and an external fastener attachable to the internal fastener, the internal fastener and external fastener capturing therebetween the peripheral edge of the image viewer opening when secured to each other; and
   wherein at least one of the openings is stretchable so as to form a passage of sufficient dimension to insert or remove the camera and lens from the housing.

2. A protective cover as claimed in claim 1 wherein the housing is comprised of a rubber latex or silicone material.

3. A protective cover as claimed in claim 1 wherein the housing comprises a flexible, transparent and waterproof material.

4. A protective cover as claimed in claim 1 wherein the opening for inserting and removing the camera is the lens opening.

5. A protective cover as claimed in claim 1 wherein the opening for inserting and removing the camera is the image viewer opening.

6. A protective cover as claimed in claim 1 further comprising a washer located between the internal fastener and the external fastener.

7. A protective cover as claimed in claim 6 wherein the peripheral edge of the lens opening or image viewer opening is captured between the internal fastener and the washer.

8. A protective cover as claimed in claim 1 wherein the internal fastener of the first fastening system comprises a UV filter attachable to the lens of the camera.

9. A protective cover as claimed in claim 1 wherein the chamber is of sufficient size to accommodate accessories therein.

10. A protective cover as claimed in claim 1 wherein the elasticized housing comprises a peripheral ring at the peripheral edge.

11. A protective cover as claimed in claim 1 wherein the housing has molding and elasticized properties configured to match the fastening systems so as to secure and seal the lens opening and image viewer opening to protect against ambient conditions as well as to facilitate usability with optimal tactile properties.

12. A protective cover as claimed in claim 1 further comprising a flash opening and a third fastening system for the flash opening.

13. A protective cover as claimed in claim 1 further comprising a tripod opening and a fourth fastening system for the tripod opening.

14. A protective cover for a camera having a lens and an image viewer, the protective cover comprising:
   a molded elasticized housing forming a chamber for receiving the camera and lens respectively, the housing having a lens opening with a peripheral edge and an image viewer opening with a peripheral edge;
   a first fastening system for the lens opening, the first fastening system having an internal fastener which is located adjacent the position of the lens of the camera and an external fastener attachable to the internal fastener, the internal fastener and external fastener capturing therebetween the peripheral edge of the lens opening when secured to each other;
   a second fastening system for the image viewer opening, the second fastening system having an internal fastener which is located adjacent the position of the image viewer of the camera and an external fastener attachable to the internal fastener, the internal fastener and external fastener capturing therebetween the peripheral edge of the image viewer opening when secured to each other; and
   wherein at least one of the openings is stretchable so as to form a passage of sufficient dimension to insert or remove the camera and lens from the housing.

15. A method for protecting a camera having a lens and an image viewer, the method comprising:
   forming a molded elasticized housing defining a chamber having a body shaped portion and a lens shaped portion and locating the camera and lens respectively in the chamber, the housing being formed with a lens opening with a peripheral edge in the lens shaped portion and an image viewer opening with a peripheral edge in the body shaped portion;
   attaching a first internal fastener to the lens of the camera and attaching a first external fastener to the first internal fastener, the first internal fastener and first external fastener capturing therebetween the peripheral edge of the lens opening when secured to each other;
   attaching a second internal fastener to the image viewer of the camera and attaching a second external fastener to the internal fastener, the second internal fastener and second external fastener capturing therebetween the peripheral edge of the image viewer opening when secured to each other; and
   inserting and removing the camera from the housing through at least one of the openings which is stretchable so as to form a passage of sufficient dimension to insert or remove the camera and lens from the housing.

* * * * *